United States Patent
Cooley et al.

(10) Patent No.: US 9,347,484 B2
(45) Date of Patent: *May 24, 2016

(54) BEARING APPARATUS HAVING SUPERHARD BEARING ELEMENTS

(71) Applicant: US SYNTHETIC CORPORATION, Orem, UT (US)

(72) Inventors: Craig H. Cooley, Saratoga Springs, UT (US); Timothy N. Sexton, Bettendorf, IA (US)

(73) Assignee: US SYNTHETIC CORPORATION, Orem, UT (US)

( * ) Notice: Subject to any disclaimer, the term of this patent is extended or adjusted under 35 U.S.C. 154(b) by 84 days.

This patent is subject to a terminal disclaimer.

(21) Appl. No.: 14/268,980

(22) Filed: May 2, 2014

(65) Prior Publication Data

US 2014/0241654 A1 Aug. 28, 2014

Related U.S. Application Data

(63) Continuation of application No. 13/955,570, filed on Jul. 31, 2013, now Pat. No. 8,746,979, which is a continuation of application No. 13/526,922, filed on Jun. 19, 2012, now Pat. No. 8,641,284, which is a (Continued)

(51) Int. Cl.
*F16C 32/06* (2006.01)
*F16C 17/00* (2006.01)

(Continued)

(52) U.S. Cl.
CPC ............... *F16C 17/08* (2013.01); *E21B 4/003* (2013.01); *E21B 4/02* (2013.01); *F16C 17/028* (2013.01); *F16C 17/047* (2013.01); *F16C 32/0692* (2013.01); *F16C 33/043* (2013.01);

(Continued)

(58) Field of Classification Search
CPC .................... F16C 2352/00; F16C 2206/04
See application file for complete search history.

(56) References Cited

U.S. PATENT DOCUMENTS

| 4,560,014 A | 12/1985 | Geczy |
| 4,756,631 A | 7/1988 | Jones |

(Continued)

FOREIGN PATENT DOCUMENTS

| EP | 0038072 | 10/1981 |
| EP | 0595630 | 5/1994 |

(Continued)

OTHER PUBLICATIONS

International Search Report and Written Opinion dated Nov. 11, 2009 from International Application No. PCT/US2008/077241.

(Continued)

*Primary Examiner* — Thomas R. Hannon
(74) *Attorney, Agent, or Firm* — Dorsey & Whitney LLP

(57) ABSTRACT

Bearing assemblies and apparatuses are disclosed. Such bearing assemblies may be employed in bearing apparatuses for use in downhole motors of a subterranean drilling system or other mechanical systems. In an embodiment of the present invention, a bearing apparatus includes a first bearing assembly including a first substantially continuous polycrystalline diamond bearing surface defining an annular surface, and a second bearing assembly including a second substantially continuous polycrystalline diamond bearing surface defining an annular surface. The second substantially continuous polycrystalline diamond bearing surface generally opposes the first substantially continuous polycrystalline diamond bearing surface.

20 Claims, 17 Drawing Sheets

Related U.S. Application Data continuation of application No. 13/014,382, filed on Jan. 26, 2011, now Pat. No. 8,220,999, which is a continuation of application No. 11/974,747, filed on Oct. 15, 2007, now Pat. No. 7,896,551.

(51) Int. Cl.

| | | |
|---|---|---|
| *F16C 17/08* | (2006.01) | |
| *E21B 4/00* | (2006.01) | |
| *F16C 33/10* | (2006.01) | |
| *F16C 33/26* | (2006.01) | |
| *F16C 43/02* | (2006.01) | |
| *F16C 17/02* | (2006.01) | |
| *F16C 17/04* | (2006.01) | |
| *F16C 33/04* | (2006.01) | |
| *E21B 4/02* | (2006.01) | |

(52) U.S. Cl.
  CPC ........... *F16C33/108* (2013.01); *F16C 33/1075* (2013.01); *F16C 33/26* (2013.01); *F16C 43/02* (2013.01); *F16C 2352/00* (2013.01)

(56) References Cited

U.S. PATENT DOCUMENTS

| | | |
|---|---|---|
| 4,892,420 A | 1/1990 | Kruger |
| 5,364,192 A | 11/1994 | Damm et al. |
| 5,366,298 A | 11/1994 | Toshimitsu et al. |
| 6,190,050 B1 | 2/2001 | Campbell |
| 7,896,551 B2 | 3/2011 | Cooley et al. |
| 8,220,999 B2 | 7/2012 | Cooley et al. |
| 8,641,284 B2 | 2/2014 | Cooley et al. |
| 2004/0190804 A1 | 9/2004 | John et al. |
| 2013/0313023 A1 | 11/2013 | Cooley et al. |

FOREIGN PATENT DOCUMENTS

| | | |
|---|---|---|
| JP | 04-194414 | 7/1992 |
| WO | WO 2009/051938 | 4/2009 |

OTHER PUBLICATIONS

U.S. Appl. No. 11/974,747, May 5, 2010, Office Action.
U.S. Appl. No. 11/974,747, Jul. 15, 2010, Office Action.
U.S. Appl. No. 11/974,747, Oct. 29, 2010, Notice of Allowance.
U.S. Appl. No. 11/974,747, Feb. 9, 2011, Issue Notification.
U.S. Appl. No. 13/014,382, Aug. 25, 2011, Office Action.
U.S. Appl. No. 13/014,382, Apr. 6, 2012, Notice of Allowance.
U.S. Appl. No. 13/014,382, Jun. 27, 2012, Issue Notification.
U.S. Appl. No. 13/526,922, Jun. 7, 2013, Office Action.
U.S. Appl. No. 13/526,922, Sep. 20, 2013, Notice of Allowance.
U.S. Appl. No. 13/526,922, Jan. 15, 2014, Issue Notification.
U.S. Appl. No. 13/955,570, Oct. 17, 2013, Office Action.
U.S. Appl. No. 13/955,570, Feb. 3, 2014, Notice of Allowance.
U.S. Appl. No. 13/955,570, May 21, 2014, Issue Notification.

BEARING APPARATUS HAVING SUPERHARD BEARING ELEMENTS

CROSS-REFERENCE TO RELATED APPLICATIONS

This application is a continuation of application Ser. No. 13/955,570 filed on 31 Jul. 2013, which is a continuation of application Ser. No. 13/526,922 filed on 19 Jun. 2012 (now U.S. Pat. No. 8,641,284 issued on 4 Feb. 2014), which is a continuation of application Ser. No. 13/014,382 filed on 26 Jan. 2011 (now U.S. Pat. No. 8,220,999 issued on 17 Jul. 2012), which is a continuation of application Ser. No. 11/974,747 filed 15 Oct. 2007 (now U.S. Pat. No. 7,896,551 issued on 1 Mar. 2011), the contents of each of the foregoing applications are incorporated herein, in their entirety, by reference.

BACKGROUND

Subterranean drilling systems that employ downhole drilling motors are commonly used for drilling boreholes in the earth for oil and gas exploration. FIG. 1 is a schematic isometric partial cross-sectional view of a prior art subterranean drilling system 100. The subterranean drilling system 100 includes a housing 102 enclosing a downhole drilling motor 104 (i.e., a motor, turbine, or any other device capable of rotating a shaft) that is operably connected to an output shaft 106. A thrust-bearing apparatus 108 is also operably coupled to the downhole drilling motor 104. A rotary drill bit 112 configured to engage a subterranean formation and drill a borehole is connected to the output shaft 106. The rotary drill bit 112 is shown as a roller cone bit including a plurality of roller cones 114. However, other types of rotary drill bits, such as so-called "fixed cutter" drill bits are also commonly used. As the borehole is drilled, pipe sections may be connected to the subterranean drilling system 100 to form a drill string capable of progressively drilling the borehole to a greater depth within the earth.

The thrust-bearing apparatus 108 includes a stator 116 that does not rotate and a rotor 118 that is attached to the output shaft 106 and rotates with the output shaft 106. The stator 116 and rotor 118 each include a plurality of bearing elements 120 that may be fabricated from polycrystalline-diamond compacts that provide diamond bearing surfaces that bear against each other during use.

In operation, high pressure drilling fluid is circulated through the drill string and power section (not shown) of the downhole drilling motor 104, usually prior to the rotary drill bit 112 engaging the bottom of the borehole, to generate torque and rotate the output shaft 106 and the rotary drill bit 112 attached to the output shaft 106. Unless rotated from above by the drill rig rotary, the housing 102 of the downhole drilling motor 104 remains stationary as the output shaft 106 rotates the rotary drill bit 112. When the rotary drill bit 112 engages the bottom of the borehole, a thrust load is generated, which is commonly referred to as "on-bottom thrust" that tends to compress the thrust-bearing apparatus 108. The on-bottom thrust is carried, at least in part, by the thrust-bearing apparatus 108. Fluid flow through the power section may cause what is commonly referred to as "off-bottom thrust," which is carried, at least in part, by another thrust-bearing apparatus that is not shown in FIG. 1. The drilling fluid used to generate the torque for rotating the rotary drill bit 112 exits openings formed in the rotary drill bit 112 and returns to the surface, carrying cuttings of the subterranean formation through an annular space between the drilled borehole and the subterranean drilling system 100. Typically, a portion of the drilling fluid is diverted by the downhole drilling motor 104 to cool and lubricate both the thrust-bearing apparatus 108 and the other thrust-bearing apparatus.

Both the off-bottom and on-bottom thrust carried by the thrust-bearing apparatuses can be extremely large. Accordingly, the operational lifetime of the thrust-bearing apparatuses often determines the useful life for the subterranean drilling system 100. For example, despite diamond having a relatively high wear resistance, repetitive contact between the bearing elements 120 of the stator 116 and the rotor 118 during drilling can cause the bearing elements 120 to wear and, eventually, fail. Moreover, even though the diamond bearing surfaces of the bearing elements 120 may have a fairly low coefficient of friction, frictional contact between the diamond bearing surfaces of the stator 116 and the rotor 118 can still lower the operational efficiency of the subterranean drilling system 100 due to frictional losses. Therefore, manufacturers and users of subterranean drilling systems continue to seek bearing apparatuses with improved wear resistance and efficiency.

SUMMARY

Hydrodynamic bearing assemblies and bearing apparatuses are disclosed. Such hydrodynamic bearing assemblies may be employed in bearing apparatuses for use in downhole motors of a subterranean drilling system or other mechanical systems. In one embodiment of the present invention, a hydrodynamic bearing assembly includes a plurality of bearing elements distributed circumferentially about an axis. Each bearing segment includes a superhard bearing surface. The plurality of bearing elements defines a plurality of seams. Each seam is formed between circumferentially-adjacent bearing elements of the plurality of bearing elements.

Further embodiments of the present invention include a hydrodynamic bearing apparatus (e.g., a radial-bearing apparatus and a thrust-bearing apparatus) and a downhole motor that may utilize any of the disclosed hydrodynamic bearing assemblies.

BRIEF DESCRIPTION OF THE DRAWINGS

The drawings illustrate several embodiments of the present invention, wherein like reference numerals refer to like elements or features in different views or embodiments shown in the drawings.

DETAILED DESCRIPTION

Embodiments of the present invention relate to a hydrodynamic bearing assembly (e.g., a rotor or stator of a thrust-bearing apparatus) including a plurality of bearing elements assembled together to form a substantially continuous bearing element. The disclosed hydrodynamic bearing assemblies may be employed in bearing apparatuses for use in a downhole motor of a subterranean drilling system and other mechanical systems.

Figure 1:
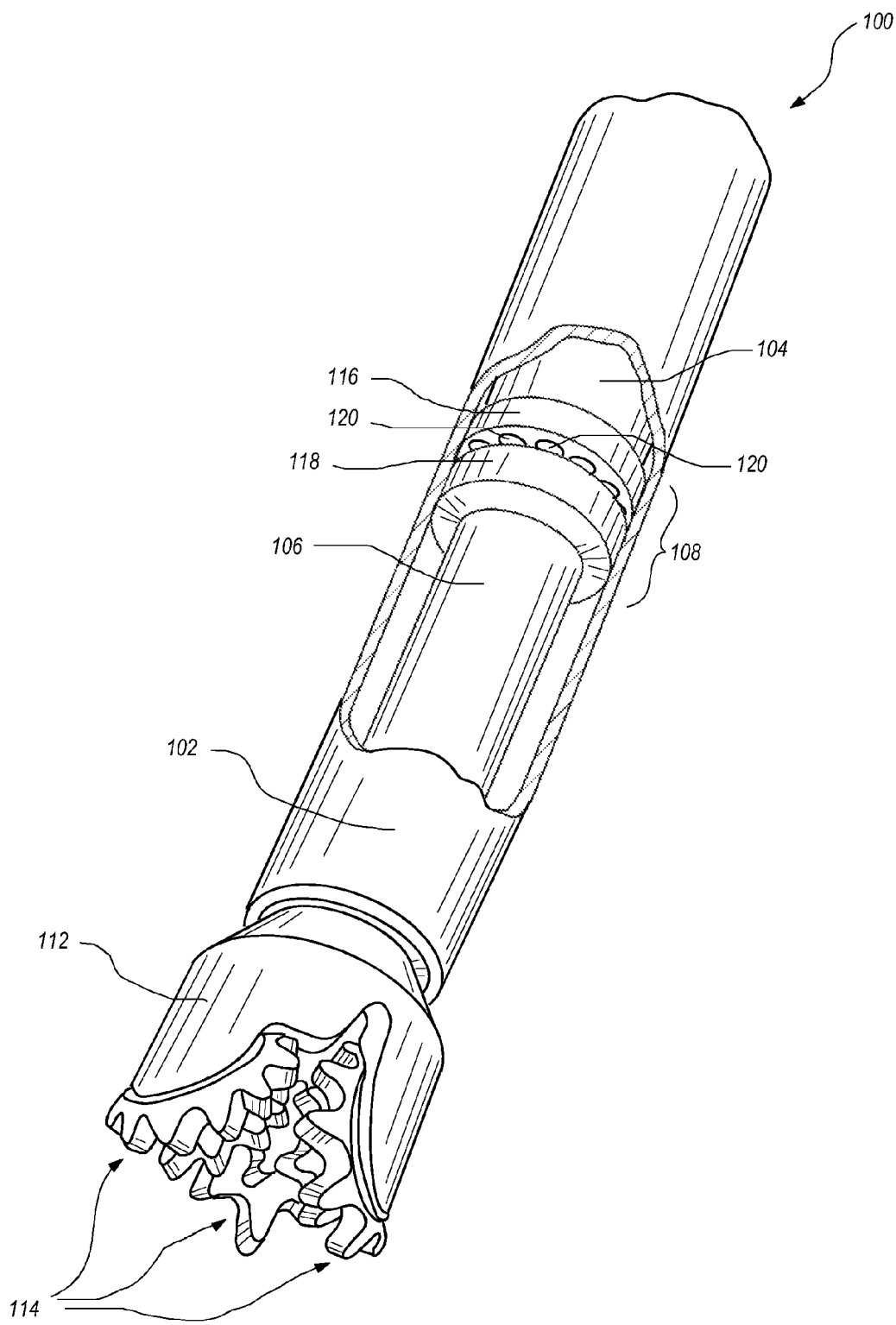
FIG. 1 is a schematic isometric partial cross-sectional view of a prior art subterranean drilling system including a thrust-bearing apparatus.
Figure 2A:
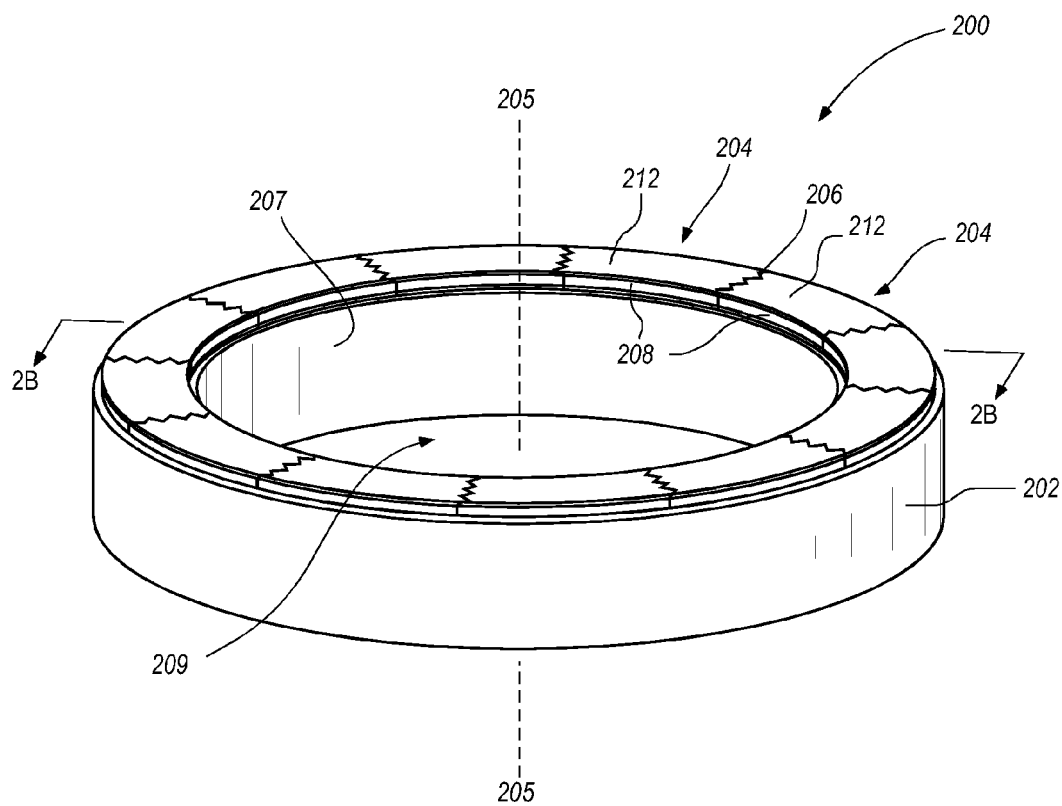
FIG. 2A is an isometric view of a hydrodynamic thrust-bearing assembly according to one embodiment of the present invention.
Figure 2B:
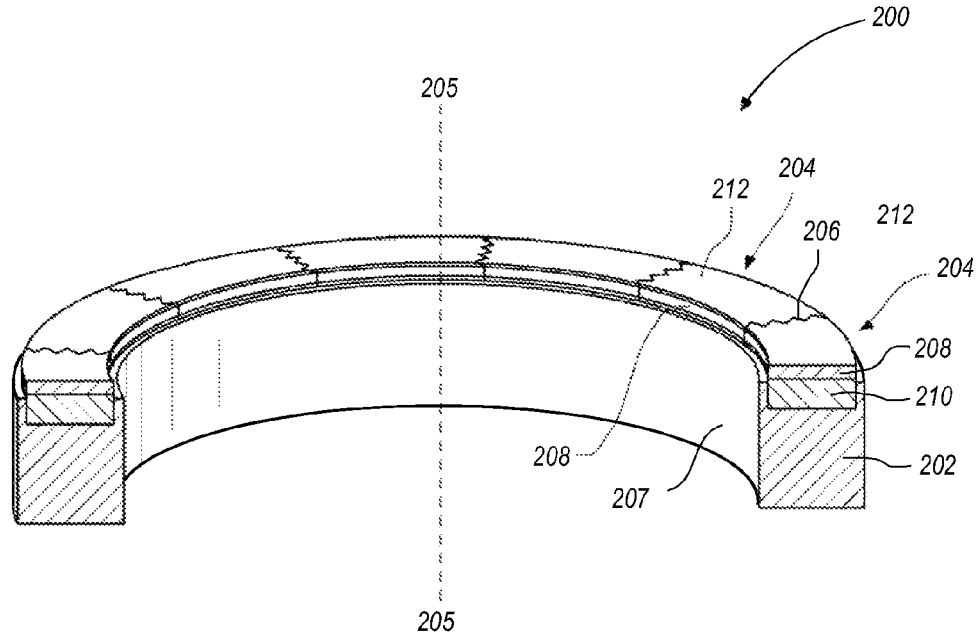
FIG. 2B is an isometric partial cross-sectional view taken along line 2B-2B of the hydrodynamic thrust-bearing assembly shown in FIG. 2A.

FIGS. 2A and 2B are isometric and isometric partial cross-sectional views, respectively, of a hydrodynamic thrust-bearing assembly 200 according to one embodiment of the present invention. The hydrodynamic thrust-bearing assembly 200 includes a support ring 202 that carries a plurality of circumferentially-adjacent, arcuately-shaped bearing elements 204. The bearing elements 204 are distributed about a thrust axis 205 along which a thrust force may be generally directed during use. Each bearing segment 204 is located circumferentially adjacent to another bearing segment 204, with a seam 206 formed therebetween. The bearing elements 204 collectively form a substantially continuous bearing element. The support ring 202 may include an inner, peripheral surface 207 defining an aperture 209 generally centered about the thrust axis 205. The aperture 209 may receive a motor shaft (e.g., a downhole drilling motor shaft).

As shown in FIG. 2B, each bearing segment 204 may be a superhard compact (e.g., a polycrystalline diamond compact ("PDC")) that includes a superhard table 208 of superhard material (e.g., polycrystalline diamond) bonded to a substrate 210 (e.g., a cobalt-cemented tungsten carbide substrate). Each superhard table 208 includes a bearing surface 212. The bearing surfaces 212 of the superhard tables 208 collectively form a substantially continuous bearing surface. The term "superhard," as used herein, means a material having a hardness at least equal to a hardness of tungsten carbide. Any superhard material may be used, such as silicon carbide, a diamond-silicon carbide composite, polycrystalline cubic boron nitride, polycrystalline cubic boron nitride and polycrystalline diamond, silicon carbide and polycrystalline boron nitride mixed with polycrystalline diamond, or any other suitable superhard material or mixture of superhard materials. However, in certain embodiments of the present invention, the superhard tables 208 may be omitted, and each bearing segment 204 may be made from a superhard material, such as cemented tungsten carbide.

Figure 2C:
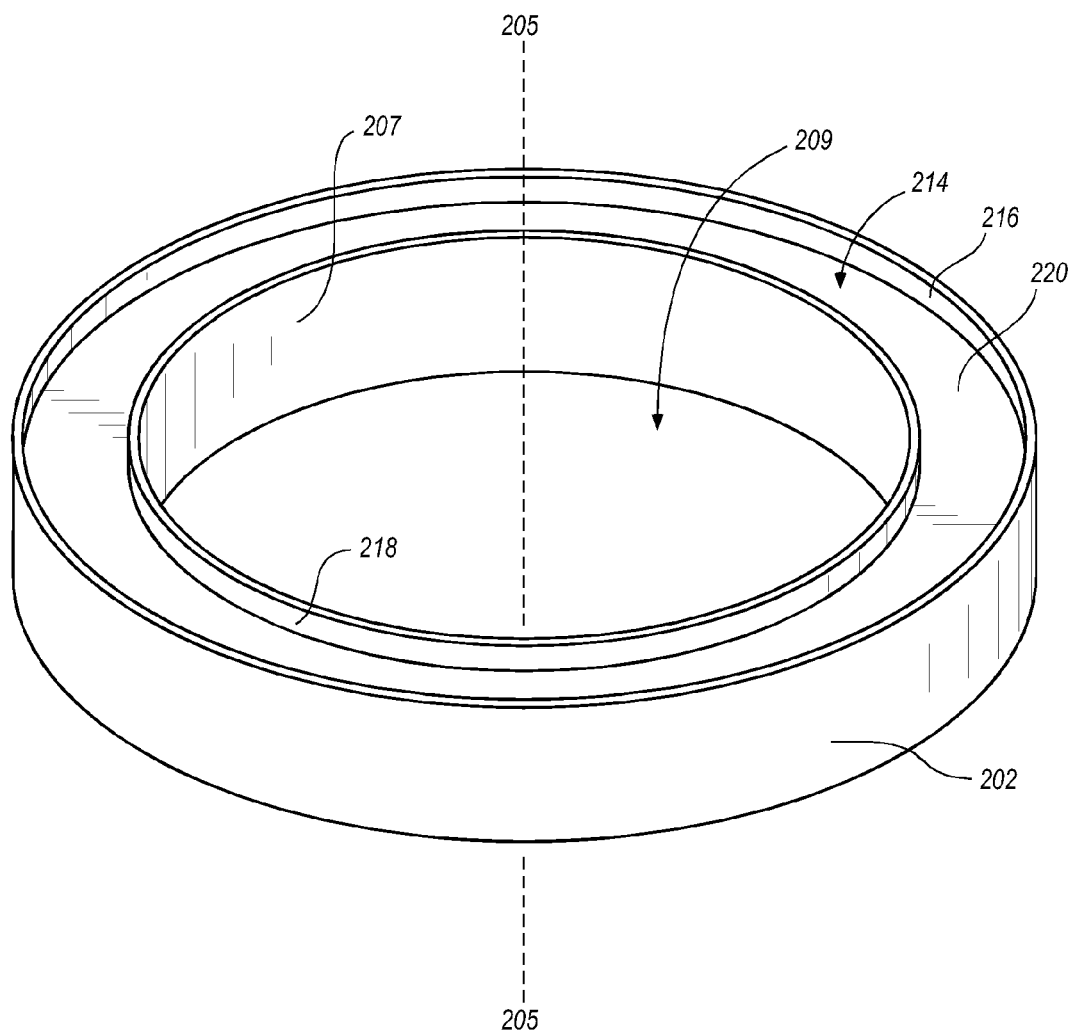
FIG. 2C is an isometric view of the support ring shown in FIGS. 2A and 2B according to one embodiment of the present invention.

FIG. 2C is an isometric view of the support ring 202 that illustrates the configuration thereof in more detail. The support ring 202 includes an annular slot 214 defined by a circumferentially extending outer wall 216, a circumferentially extending inner wall 218, and a base 220. The bearing elements 204 (FIGS. 2A and 2B) may be assembled within the annular slot 214 and secured to the support ring 202 within the annular slot 214 by brazing the bearing elements 204 (FIGS. 2A and 2B) to the support ring 202, press-fitting the bearing elements 204 (FIGS. 2A and 2B) to the support ring 202 and/or with or against each other, attaching each of the bearing elements 204 (FIGS. 2A and 2B) to the support ring 202 with a fastener, or another suitable technique. It is noted that the support ring 202 merely represents one embodiment for a support ring and other configurations may be used. For example, according to another embodiment of the present invention, a support ring may lack an annular slot.

Figure 2D:
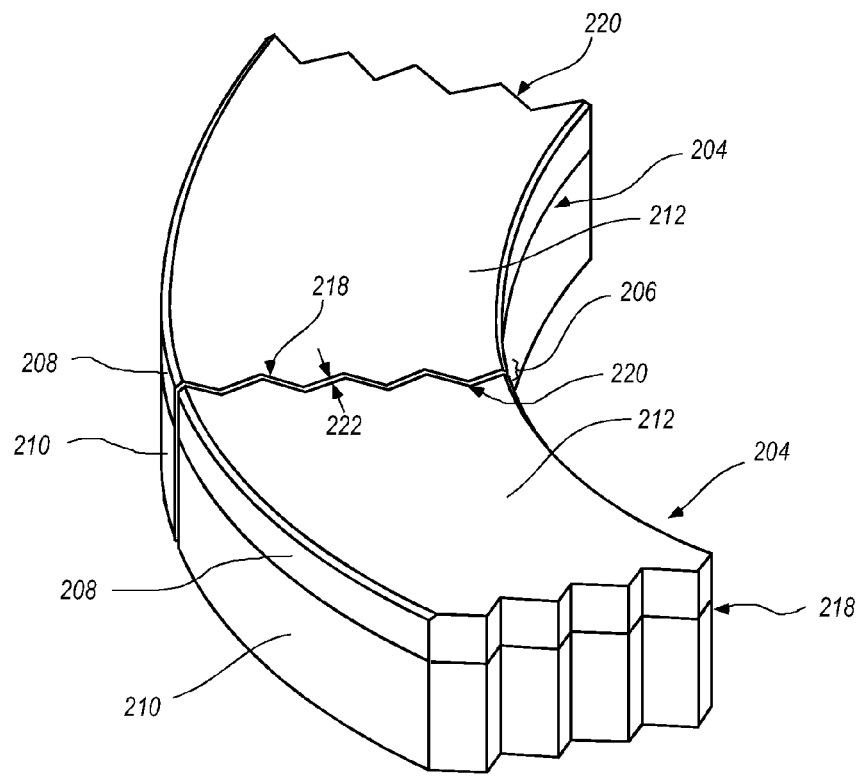
FIG. 2D is an isometric view of two adjacent bearing elements shown in FIGS. 2A and 2B assembled together to form a seam therebetween.
Figure 2E:
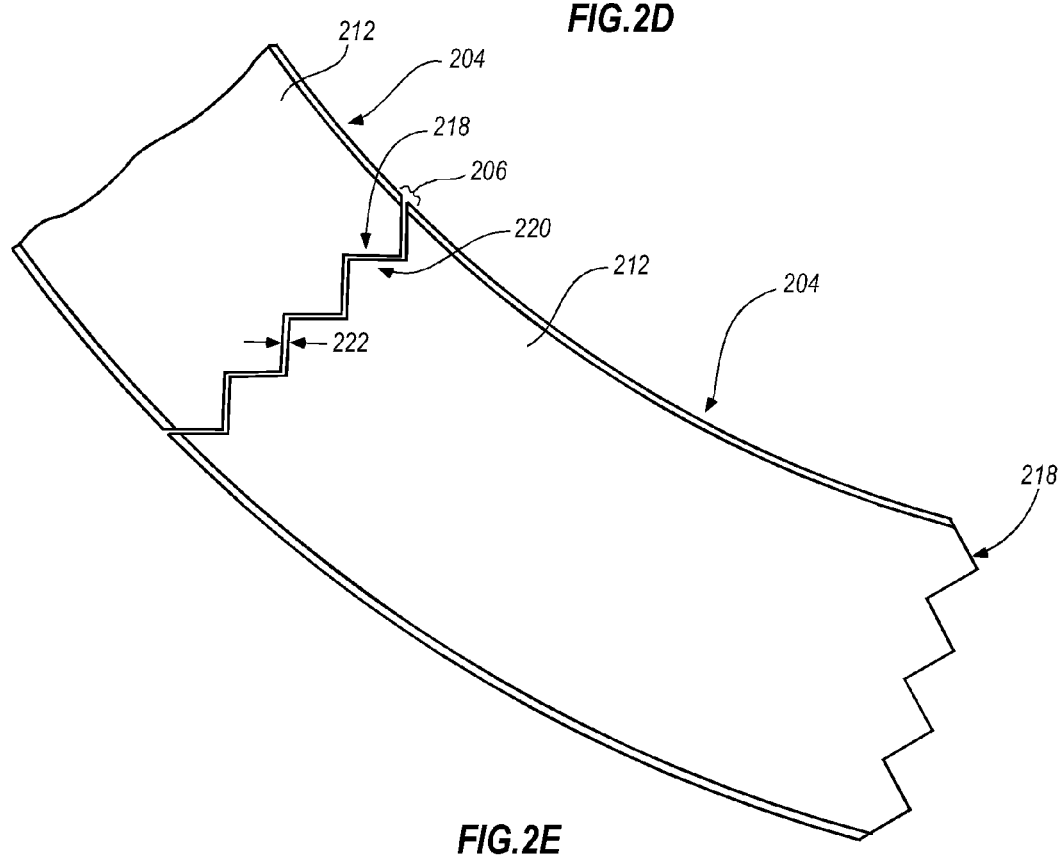
FIG. 2E is a top plan view of the two adjacent bearing elements shown in FIG. 2D.
Figure 2F:
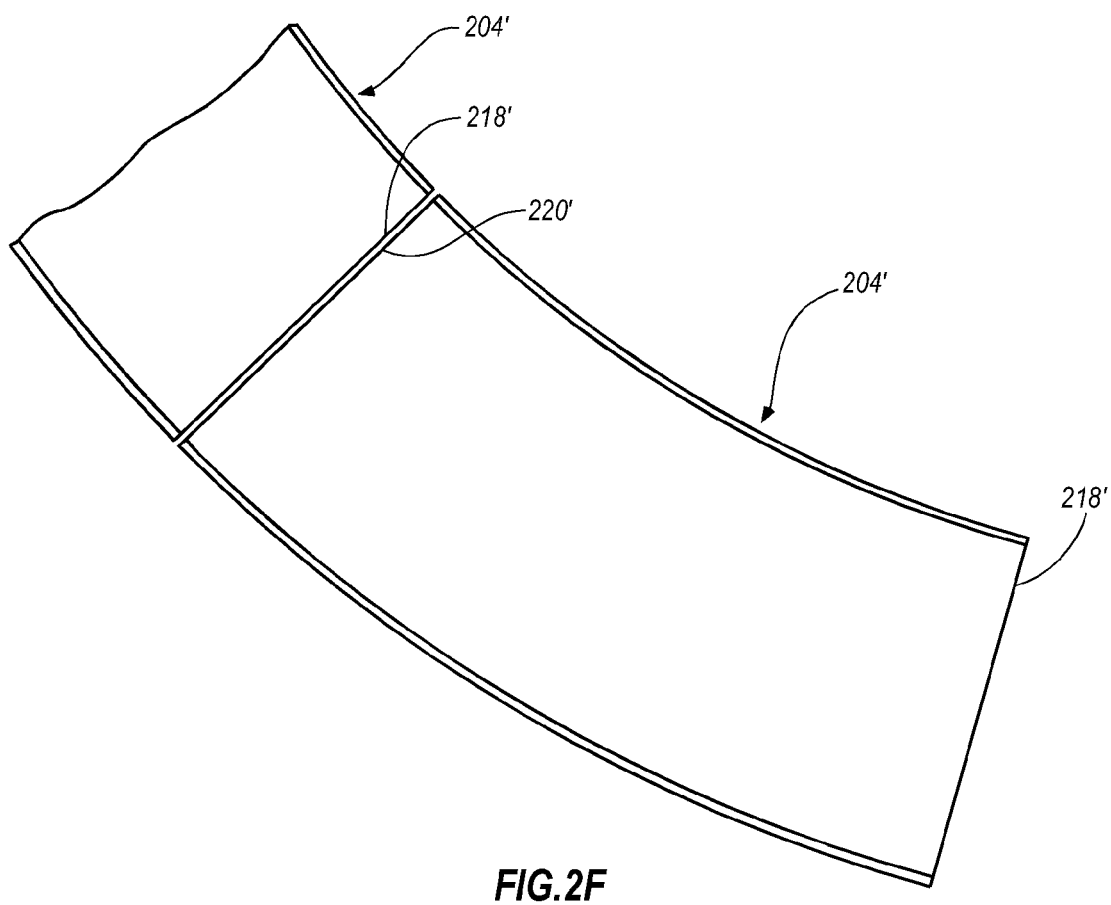
FIG. 2F is a top plan view of two adjacent bearing elements, with each bearing segment including substantially planar ends, according to another embodiment of the present invention.
Figure 2G:
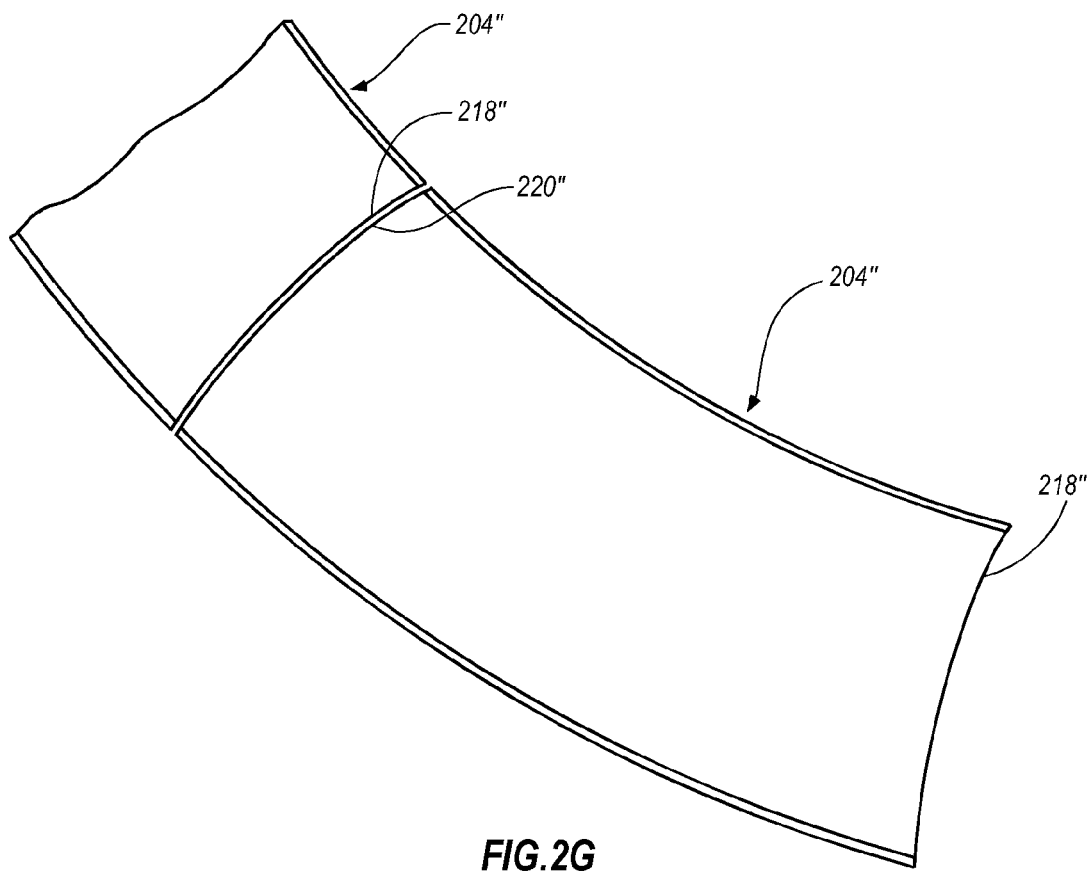
FIG. 2G is a top plan view of two adjacent bearing elements, with each bearing segment including curved ends, according to yet another embodiment of the present invention.

FIGS. 2D and 2E are isometric and plan views, respectively, that show the structure of the bearing elements 204 and the manner in which the bearing elements 204 may be assembled together. Each bearing segment 204 includes a first end region 218 and a second end region 220, with one of the bearing surfaces 212 extending therebetween. Each first end region 218 and second end region 220 may be configured to limit fluid from being able to leak through the seams 206 formed between adjacent bearing elements 204. For example, the second end region 220 of one bearing segment 204 may be configured to correspond with and, in some embodiments, may mesh with the first end region 218 of an adjacent bearing segment 204. In the illustrated embodiment, each first end region 218 and second end region 220 of the bearing elements 204 is configured with a serrated geometry. Such a configuration may provide a tortuous path to limit fluid leakage radially through the seams 206. Depending upon the tolerances of the bearing elements 204, all or a portion of the seams 206 may comprise a relatively small gap 222. For example, the gap 222 may exhibit a width of about 0.00020 inches (0.0051 mm) to about 0.100 inches (2.54 mm), and more particularly about 0.00020 inches (0.0051 mm) to about 0.020 inches (0.051 mm). In another embodiment of the present invention shown in FIG. 2F, a first end region 218' and a second end region 220' of each bearing segment 204' may be substantially planar and may abut with each other when assembled. In yet a further embodiment of the present invention shown in FIG. 2G, a first end region 218" and a second end region 220" of each bearing segment 204" may exhibit curved surfaces configured to mate with each other when assembled.

Figure 3:
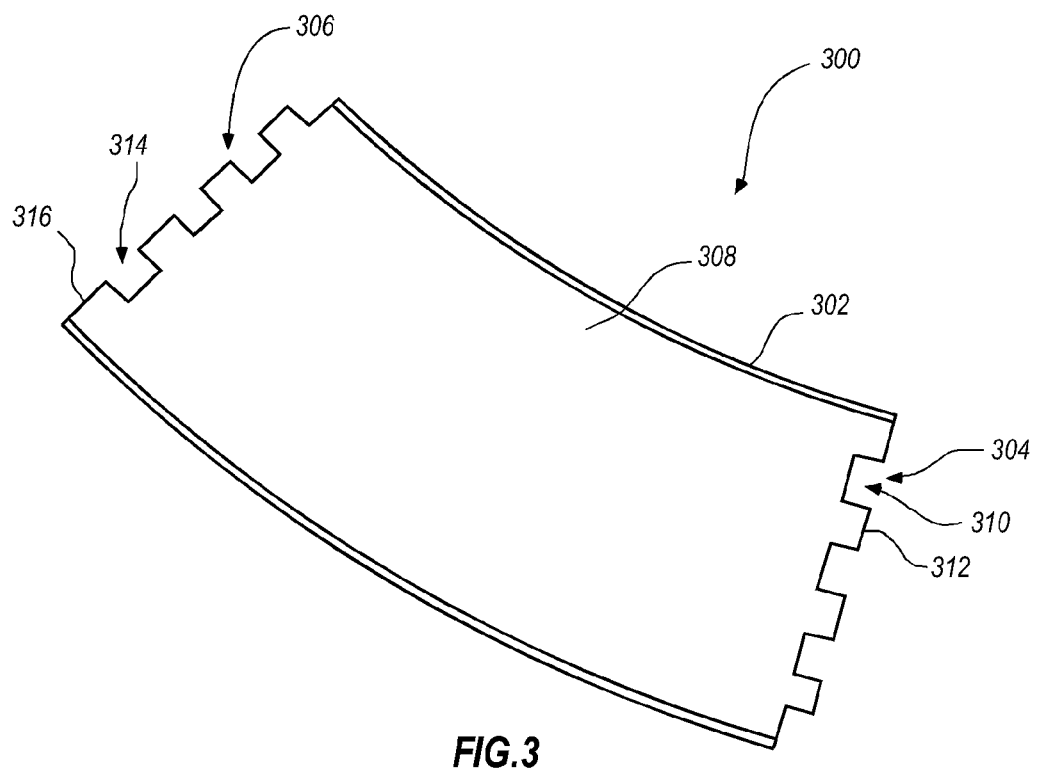
FIG. 3 is top plan view of a bearing segment comprising ends configured to limit fluid leakage according to another embodiment of the present invention.

In other embodiments of the present invention, each first end region 218 and second end region 220 may exhibit another, selected non-planar configuration that departs from the illustrated embodiment shown in FIGS. 2D and 2E. For example, FIG. 3 is a top plan view that shows a bearing segment 300 according to another embodiment of the present invention. The bearing segment 300 includes a superhard table 302 bonded to a substrate (not shown) including a first end region 304, a second end region 306, and a bearing surface 308 of the superhard table 302 extending between the first end region 304 and second end region 306. The first end region 304 comprises rectangular-shaped slots 310 and rectangular-shaped ridges 312 and the second end region 306 also includes rectangular-shaped slots 314 and rectangular-shaped ridges 316 to enable at least partial interlocking of a first end region 304 of one bearing segment 300 with a second end region 306 of another, circumferentially-adjacent bearing segment 300.

Figure 4A:
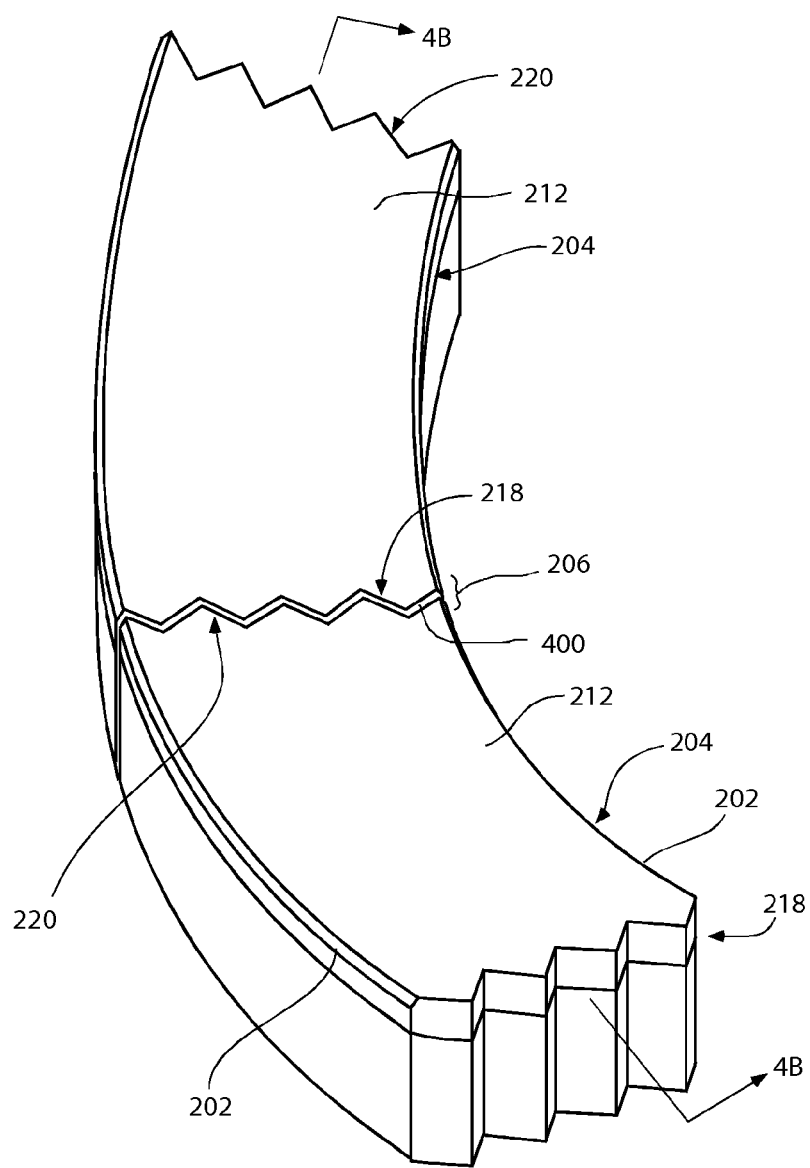
FIG. 4A is a top plan view of the two adjacent bearing elements shown in FIGS. 2D and 2E, with a sealant material disposed within the seam, according to another embodiment of the present invention.
Figure 4B:
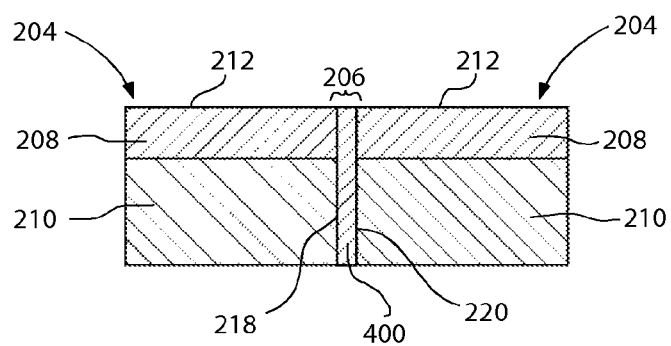
FIG. 4B is a cross-sectional view of the two adjacent bearing elements shown in FIG. 4B taken along line 4B-4B.

As discussed above, each bearing segment 204 is positioned circumferentially adjacent to another bearing segment 204, with one of the seams 206 formed therebetween. If present, the gaps 222 located between adjacent bearing elements 204 may be filled with a sealant material to help further prevent leakage of fluid through the seams 206 (e.g., radially outwardly). For example, FIGS. 4A and 4B are isometric and cross-sectional views, respectively, that show another embodiment of the present invention in which the gaps 222 shown in FIG. 2E may be substantially filed with a sealant material 400. For example, the sealant material 400 may comprise a ceramic material, a metallic material, a polymeric material, or another suitable material. In one embodiment of the present invention, the sealant material 400 may exhibit abrasion and/or erosion resistance to commonly used drilling fluids (also known as drilling mud). For example, the sealant material 400 may comprise chemically-vapor-deposited ("CVD") diamond or a chemically-vapor-deposited carbide material (e.g., binderless tungsten carbide). Specifically, one example of a commercially available CVD binderless tungsten carbide material (currently marketed under the trademark HARDIDE®) is currently available from Hardide Layers Inc. of Houston, Tex. In other embodiments, a binderless tungsten carbide material may be formed by physical vapor deposition ("PVD"), variants of PVD, high-velocity oxygen fuel ("HVOF") thermal spray processes, or any other suitable process, without limitation. In other embodiments of the present invention, the braze alloy used to braze the bearing elements 204 to the support ring 202 may infiltrate the seams 206 and substantially fill the gaps 222. For example, suitable abrasion resistant braze alloys include, but are not limited to, silver-copper based braze alloys commercially available from Handy & Harmon of Canada Limited known as braze 505 and braze 516 may be employed. In another embodiment of the present invention, the sealant material 400 may also comprise a hardfacing material (e.g., a nickel or cobalt alloy) applied at least within the gaps 222 by thermal spraying. In yet a further embodiment of the present invention, the sealant material 400 may comprise polyurethane or another suitable polymeric material.

In another embodiment of the present invention, a substantially continuous superhard bearing surface may be formed by depositing a layer of diamond onto a generally planar surface of a support ring. For example, the layer of diamond may be deposited using chemical vapor deposition.

Figure 5A:
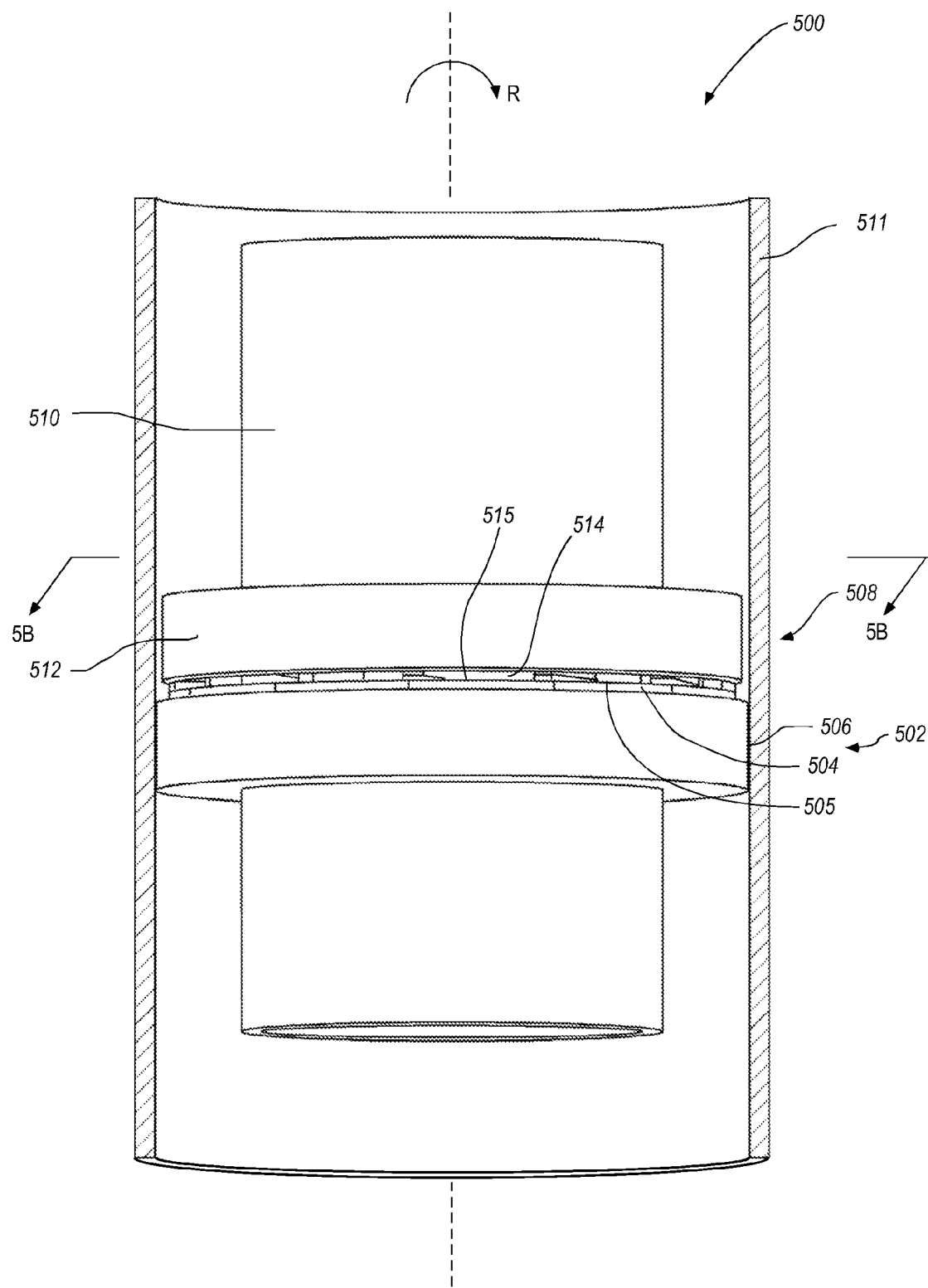
FIG. 5A is an isometric view of a thrust-bearing apparatus that may employ any of the disclosed hydrodynamic thrust-bearing assemblies according to one embodiment of the present invention, with the housing shown in cross-section.
Figure 5B:
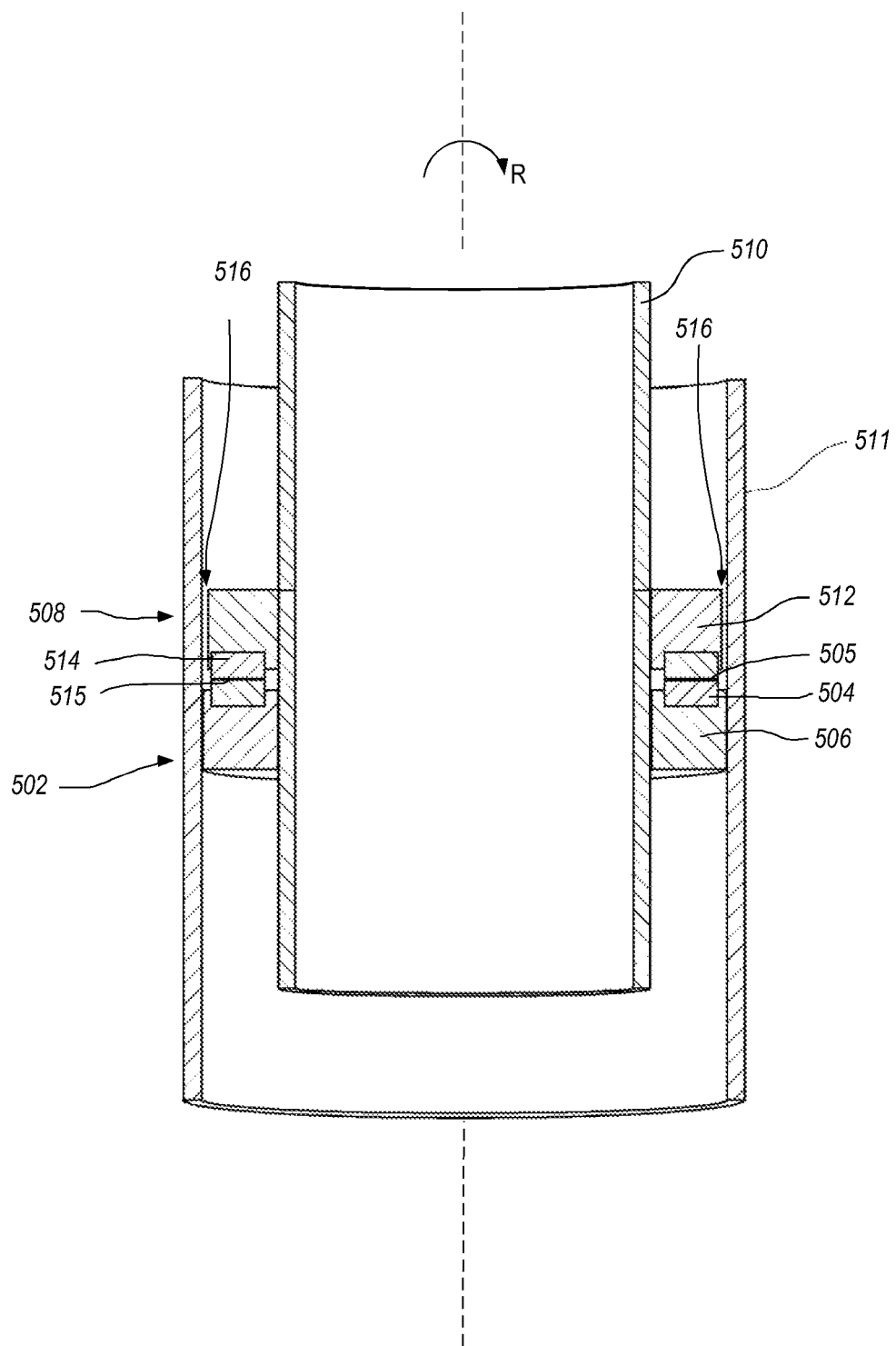
FIG. 5B is an isometric view of the thrust-bearing apparatus shown in FIG. 5A taken along line 5B-5B.

Any of the above-described hydrodynamic thrust-bearing assemblies embodiments may be employed in a hydrodynamic thrust-bearing apparatus. FIGS. 5A and 5B are isometric partial cross-sectional views of a hydrodynamic thrust-bearing apparatus 500 according to one embodiment of the present invention. The hydrodynamic thrust-bearing apparatus 500 may include a stator 502 configured as any of the previously described embodiments of hydrodynamic thrust-bearing assemblies. The stator 502 includes a plurality of circumferentially-adjacent bearing elements 504 (e.g., a plurality of superhard compacts), each of which includes a bearing surface 505 and may exhibit, for example, the configuration of the bearing segment 204. The bearing elements 504 may be mounted or otherwise attached to a support ring 506. The hydrodynamic thrust-bearing apparatus 500 further includes a rotor 508. The rotor 508 includes a support ring 512 and a plurality of bearing elements 514 (e.g., a plurality of superhard compacts) mounted or otherwise attached to the support ring 512, with each of the bearing elements 514 having a bearing surface 515. The terms "rotor" and "stator" refer to rotating and stationary components of the thrust-bearing apparatus 500, respectively. As shown in FIG. 5B, a shaft 510 may be coupled to the support ring 512 and operably coupled to an apparatus capable of rotating the shaft section 510 in a direction R (or in an opposite direction), such as a downhole motor. For example, the shaft 510 may extend through and may be secured to the support ring 512 of the rotor 508 by press-fitting or threadly coupling the shaft 510 to the support ring 512 or another suitable technique. A housing 511 may be secured to the support ring 506 of the stator 502 by, for example, press-fitting or threadly coupling the housing 511 to the support ring 506 and may extend circumferentially about the shaft 510 and the rotor 508.

Figure 5C:
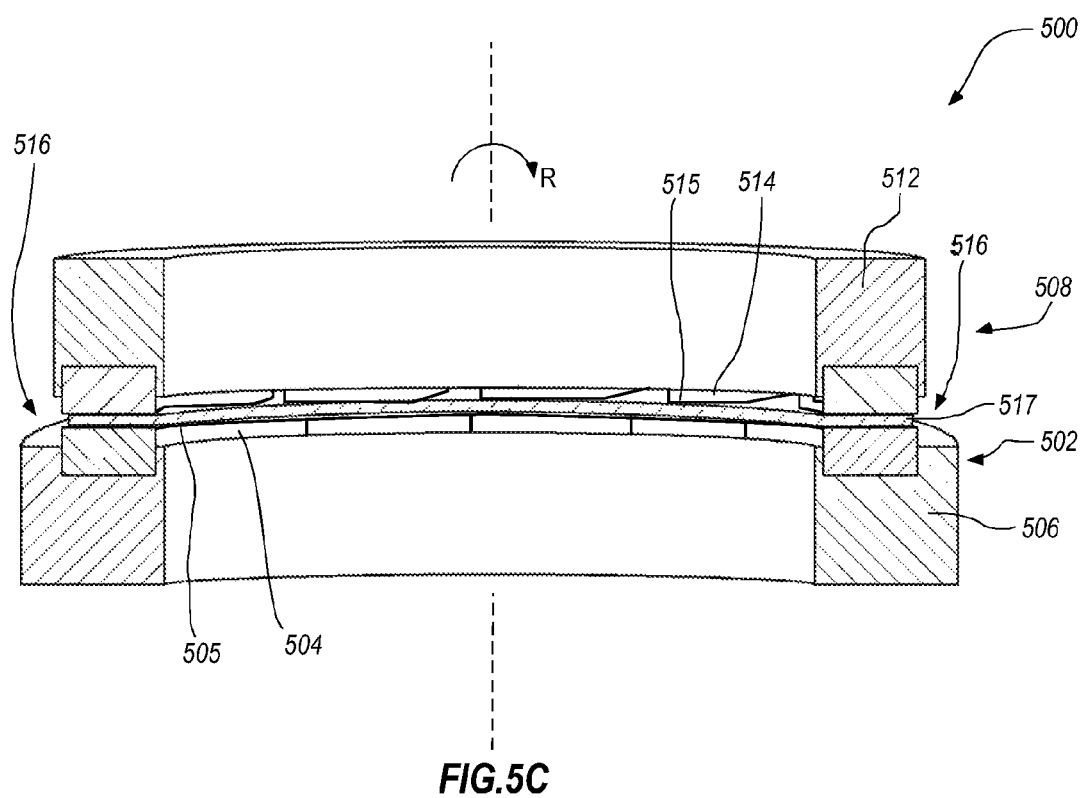
FIG. 5C is an isometric partial cross-sectional view of the thrust-bearing apparatus shown in FIG. 5A taken along line 5B-5B showing a fluid film that develops between the bearing elements of the rotor and stator during certain operational conditions, with the shaft and housing not shown for clarity.

The operation of the hydrodynamic thrust-bearing apparatus 500 is discussed in more detail with reference to FIGS. 5B and 5C. FIG. 5C is an isometric partial cross-sectional view in which the shaft 510 and housing 511 are not shown for clarity. As shown in FIG. 5B, in operation, drilling fluid or mud 516 may be pumped between the shaft 510 and the housing 511, and between the bearing elements 514 of the rotor 508. As shown in FIG. 5C, rotation of the rotor 508 at a sufficient rotational speed sweeps the drilling fluid onto bearing surfaces 505 of the stator 502 and allows a fluid film 517 to develop between the bearing surfaces 505 of the stator 502 and the bearing surfaces 515 of the rotor 508. Because the stator 502 includes a plurality of the closely-spaced bearing elements 504, the fluid film 517 may develop under certain operational conditions in which the rotational speed of the rotor 508 is sufficiently great and the thrust load is sufficiently low. Under certain operational conditions, the pressure of the fluid film 517 is sufficient to prevent contact between the bearing surfaces 505 of the stator 502 and the bearing surfaces 515 of the rotor 508 and, thus, substantially reduce wear of the bearing surfaces 504 and bearing elements 514. When the thrust loads exceed a certain value and/or the rotational speed of the rotor 508 is reduced, the pressure of the fluid film 517 is not sufficient to prevent the bearing surfaces 505 of the stator 502 and the bearing surfaces 515 of the rotor 508 from contacting each other. Under such operational conditions, the hydrodynamic thrust-bearing apparatus 500 is not operated as a hydrodynamic bearing. Thus, under certain operational conditions, the hydrodynamic thrust-bearing apparatus 500 may be operated as a hydrodynamic thrust-bearing apparatus and under other conditions the hydrodynamic thrust-bearing apparatus 500 may be operated so that the bearing surfaces 505 and bearing surfaces 515 contact each other during use or a partially developed fluid film is present between the bearing surfaces 505 and bearing surfaces 515. However, the bearing elements 504 and bearing elements 514 comprising superhard materials are sufficiently wear-resistant to accommodate repetitive contact with each other, such as during start-up and shut-down of a subterranean drilling system employing the hydrodynamic thrust-bearing apparatus 500 or other operational conditions not favorable for forming the fluid film 517.

It is noted that in certain embodiments of the present invention, the rotor may be configured as any of the previously described embodiments of hydrodynamic thrust-bearing assemblies instead of the stator.

Figure 5D:
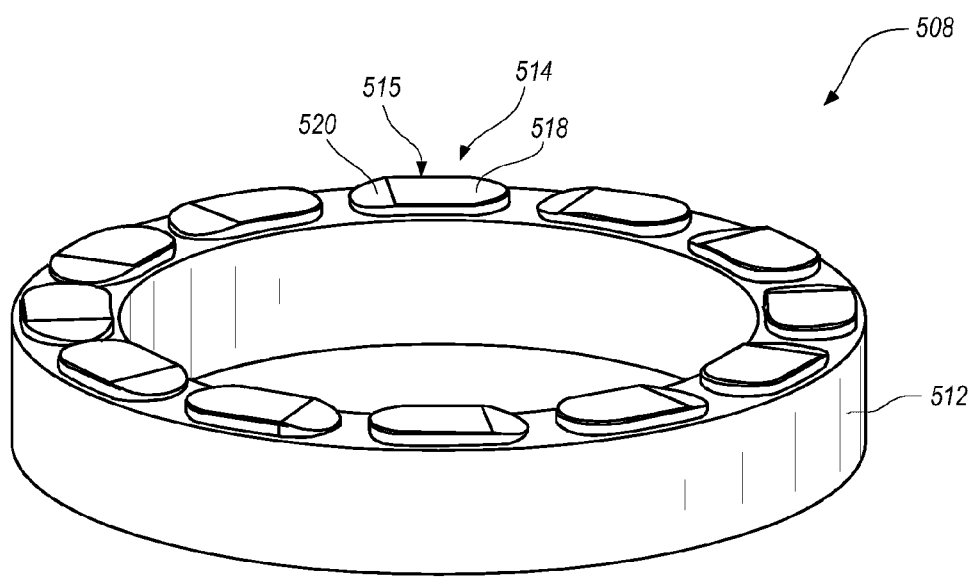
FIG. 5D is an isometric view of the rotor shown in FIGS. 5A and 5B.

FIG. 5D is a top isometric view of the rotor 508 that illustrates the configuration of the bearing elements 514 thereof in more detail. The bearing surface 515 of each bearing elements 514 may include a load bearing section 518 and a leading section 520 that is configured to promote formation of the fluid film 517 (FIG. 5C). For example, each bearing element 514 may include a superhard table bonded to a substrate, with the load bearing section 518 and the leading section 520 formed in the superhard table. The leading section 520 may slope at an angle relative to the load bearing section 518. The leading section 518 may be configured to promote sweeping the drilling fluid 516 (FIGS. 5B and 5C) between the bearing surfaces 505 (FIG. 5C) of the stator 502 (FIG. 5C) and, consequently, formation of the fluid film 517 shown in FIG. 5C while the rotor 508 is rotated. When operated under conditions that allow for formation of the fluid film 517, the load bearing section 518 and the bearing surfaces 505 of the stator 502 (FIG. 5C) may not contact each other due to the pressure of the fluid film 517 (FIG. 5C).

Figure 5E:
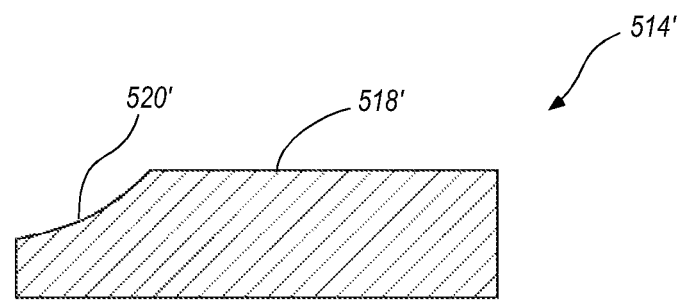
FIG. 5E is a cross-sectional view of a bearing element including a leading section exhibiting a concavely curved geometry according to another embodiment of the present invention.
Figure 5F:
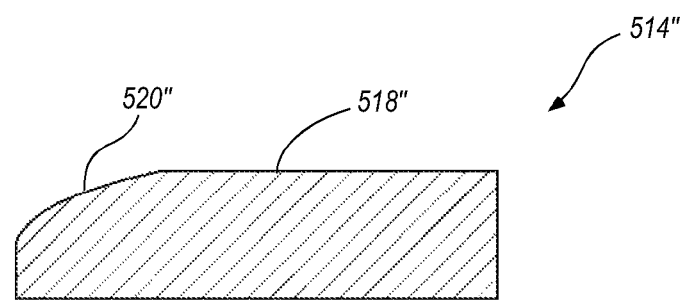
FIG. 5F is a cross-sectional view of a bearing element including a leading section geometry exhibiting a convexly curved geometry according to a further embodiment of the present invention.
Figure 5G:
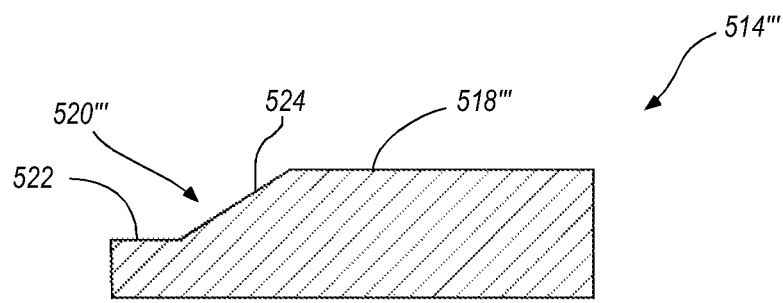
FIG. 5G is a cross-sectional view of a bearing element including a leading section exhibiting a non-planar geometry according to yet another embodiment of the present invention.

In other embodiments of the present invention, each bearing element of the rotor 508 may include a leading section that exhibits a non-planar geometry. For example, FIG. 5E is a cross-sectional view of a bearing element 514' according to another embodiment of the present invention. The bearing element 514' includes a load bearing section 518', with a leading section 520' that may arcuately approach the load bearing section 518 and exhibit a concave curvature. FIG. 5F is a cross-sectional view of a bearing element 514'' according to another embodiment of the present invention. The bearing element 514'' includes a load bearing section 518'', with a leading section 520'' that may arcuately approach the load bearing section 518 and exhibit a convex curvature. FIG. 5G is a cross-sectional view of a bearing element 514''' according to another embodiment of the present invention. The bearing element 514''' includes a load bearing section 518''', with a leading section 520''' comprising a first section 522 that may be substantially parallel to the load bearing section 518''' and a second section 524 that slopes at an angle from the load bearing section 518''' and may be substantially planar. In yet another embodiment of the present invention, the leading section 520 may include a slot or recess formed therein configured to promote forming the fluid film 517 (FIG. 5C) between the bearing elements 514 of the rotor 508 and the bearing elements 504 of the stator 502 that may be as a result of a beneficial radial pressure gradient over the bearing elements 514. In other embodiments of the present invention, the bearing elements 514 may be conventional in construction, without the leading edge sections 220.

Figure 6A:
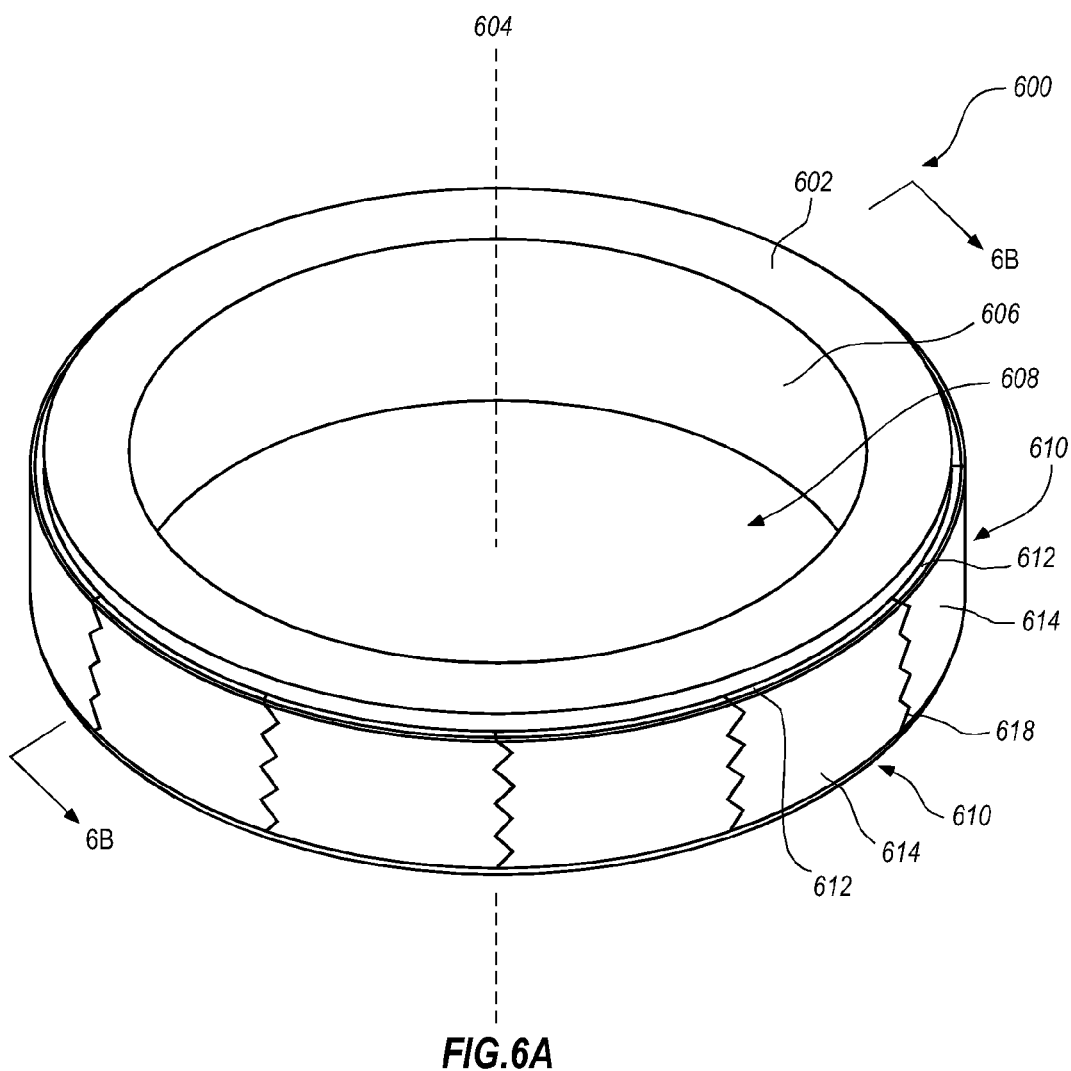
FIG. 6A is an isometric view of a hydrodynamic radial-bearing assembly according to another embodiment of the present invention.
Figure 6B:
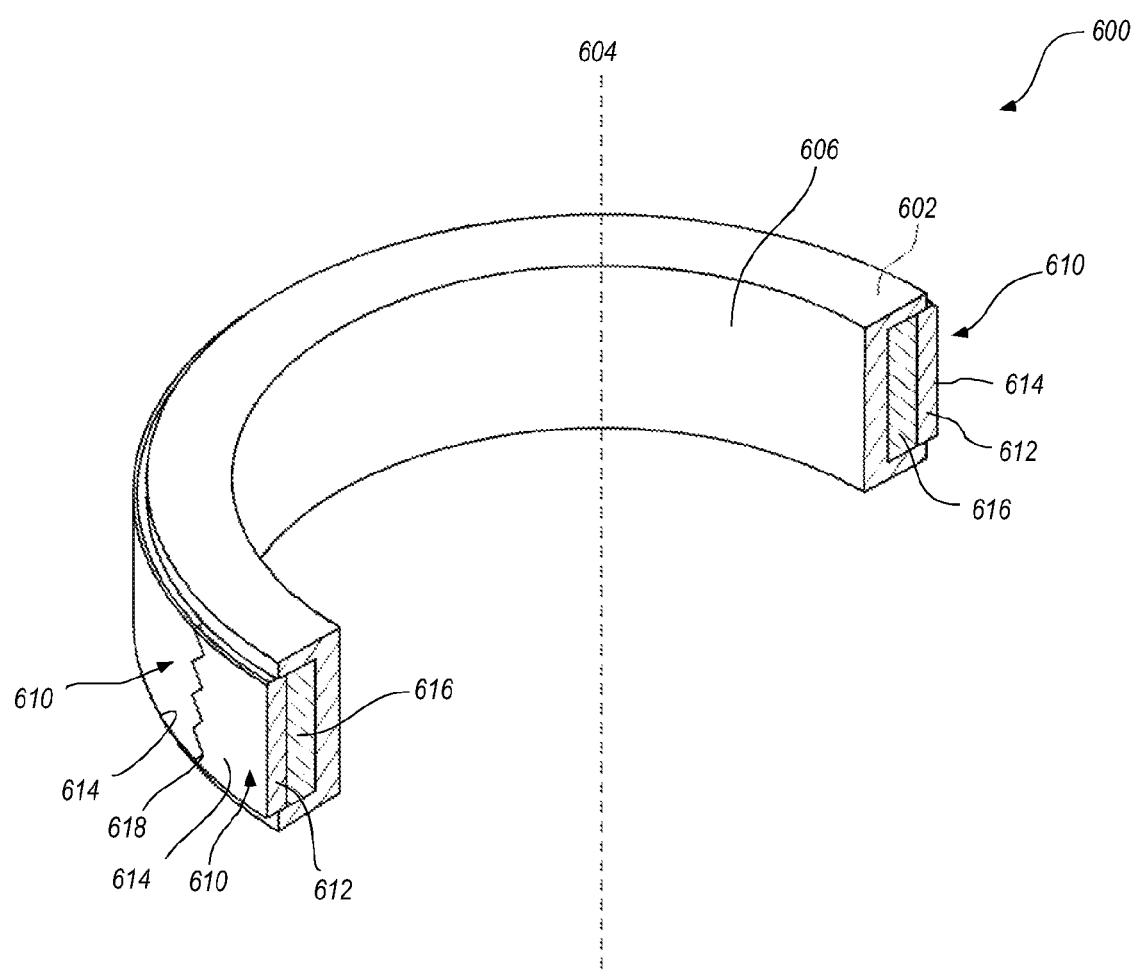
FIG. 6B is an isometric partial cross-sectional view taken along line 6B-6B.

The concepts used in the thrust-bearing assemblies and apparatuses described above may also be employed in radial-bearing assemblies and apparatuses. FIGS. 6A and 6B are isometric and isometric partial cross-sectional views, respectively, illustrating a radial-bearing assembly 600 according to one embodiment of the present invention. The radial-bearing assembly 600 includes a support ring 602 extending about an axis 604. The support ring 602 includes an interior surface 606 defining an opening 608 that is capable of receiving, for example, a shaft of a motor from a downhole motor assembly or other apparatus. A plurality of bearing elements 610 are distributed circumferentially about the axis 604. Each bearing segment 610 comprises a superhard table 612 including a convexly-curved bearing surface 614. Each superhard table 612 may be bonded to a corresponding substrate 616. (FIGS. 6B and 6D). Each bearing surface 614 may be convexly curved to lie on an imaginary cylindrical surface. The superhard tables 612 and substrates 616 may be fabricated from the same materials described above for the bearing elements 204 shown in FIGS. 2A and 2B.

With continued reference to FIGS. 6A and 6B, a seam 618 is formed between circumferentially-adjacent bearing elements 610. As with the thrust-bearing assembly 200 described above, if desired, any of the previously described sealant materials may be disposed within a gap (not shown) that may be formed between adjacent bearing elements 610 to help further prevent fluid leakage through the seams 618.

Figure 6C:
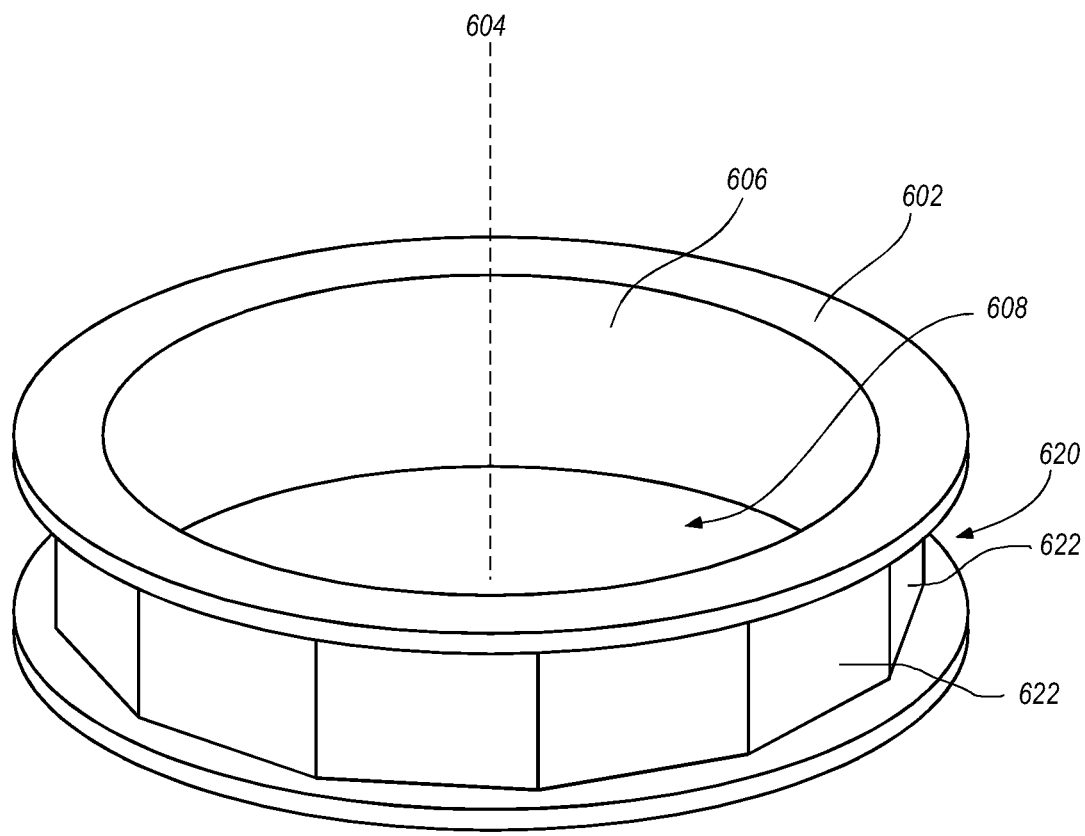
FIG. 6C is an isometric view of the support ring shown in FIGS. 6A and 6B according to one embodiment of the present invention.
Figure 6D:
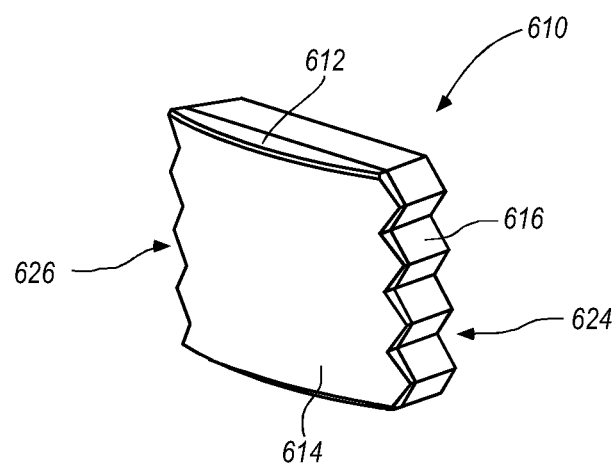
FIG. 6D is an isometric view of one of the bearing elements shown in FIGS. 6A and 6B.

FIG. 6C is an isometric view of the support ring 602 that shows the configuration thereof in more detail. The support ring 602 includes a circumferentially extending recess 620 partially defined by generally planar surfaces 622 that intersect each other an angle greater than zero degrees. The bearing elements 610 may be secured within the slot 620 by brazing, press-fitting, using fasteners, or another suitable technique.

FIG. 6D is an isometric view of one of the bearing elements 610 that shows the structure thereof in more detail, which may be representative of all of the bearing elements 610 shown in FIGS. 6A and 6B. As shown and discussed above, the bearing segment 610 includes a superhard table 612 bonded to the substrate 616. As with the bearing elements 204, the bearing segment 610 includes a first end region 624 and a second end region 626, with the bearing surface 614 extending therebetween. The first end region 624 and second end region 624 may exhibit any of the previously described geometries, such as a serrated geometry illustrated in FIGS. 6A through 6D or the end geometries shown in FIGS. 2F, 2G, and 3 to enable mating adjacent bearing elements together and limit fluid leakage through seams between adjacent bearing elements.

Figure 7A:
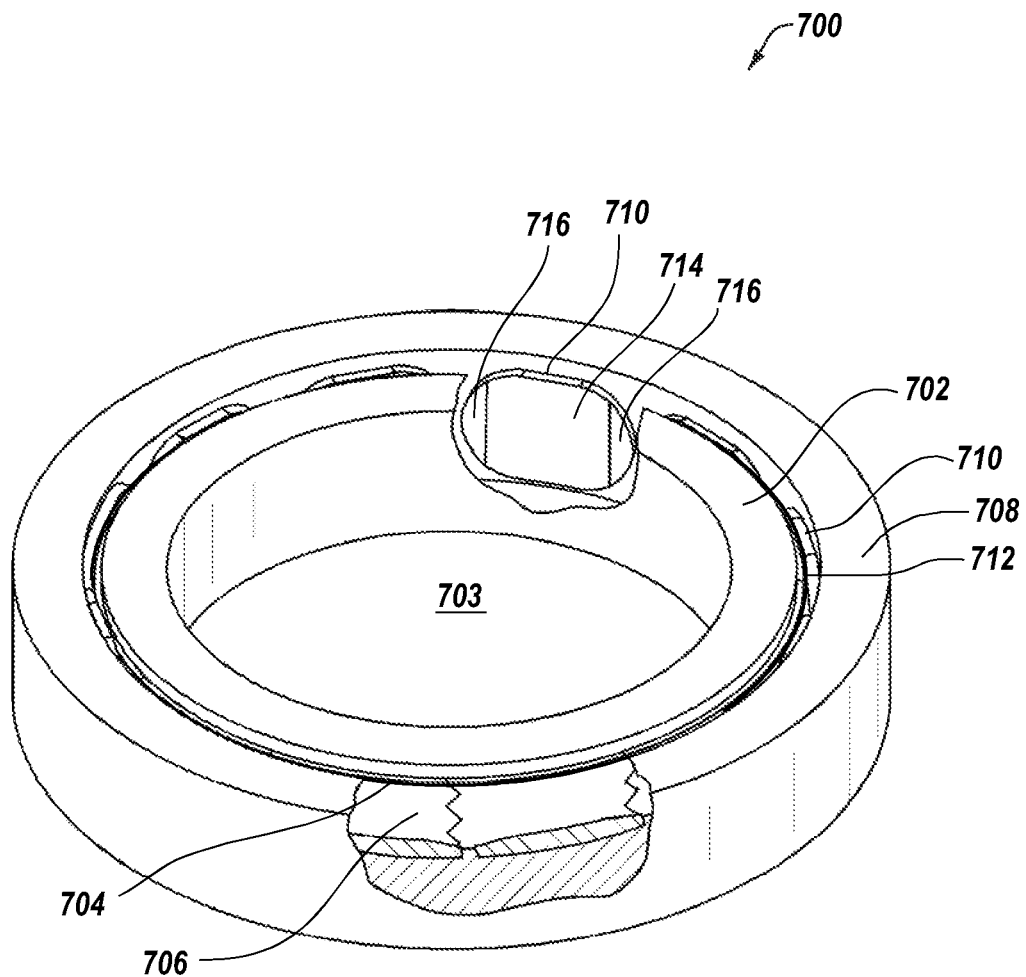
FIG. 7A is an isometric partial cross-sectional view of a radial-bearing apparatus that may utilize any of the disclosed hydrodynamic radial-bearing assemblies according to one embodiment of the present invention.
Figure 7B:
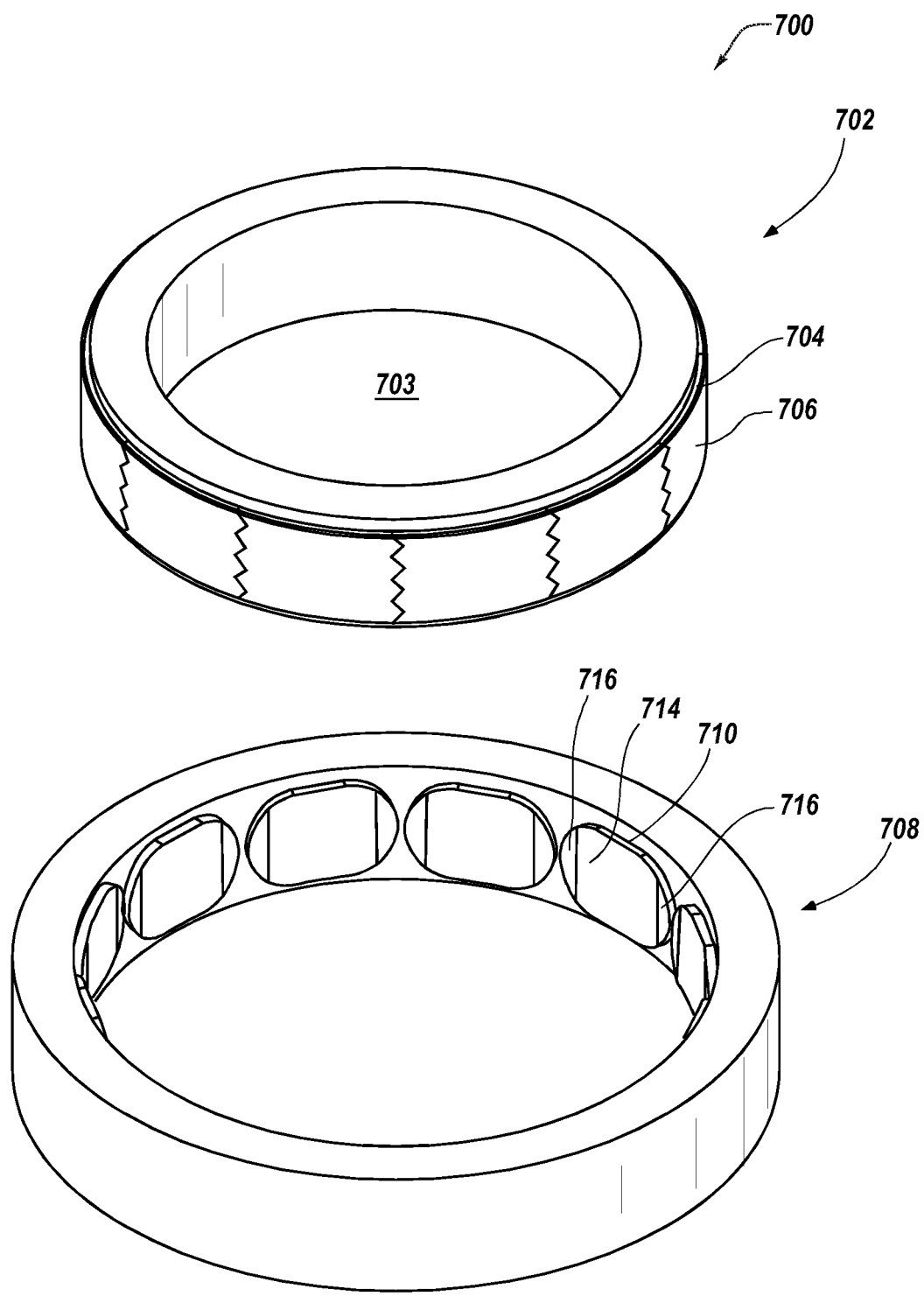
FIG. 7B is an exploded isometric view of the radial-bearing apparatus shown in FIG. 7A.

FIGS. 7A and 7B are isometric partial cross-sectional and exploded isometric views, respectively, of a radial-bearing apparatus 700 according to yet another embodiment of the present invention. The radial-bearing apparatus 700 includes an inner race 702 (i.e., a stator) that may be configured as the radial-bearing assembly 600 shown in FIG. 6A. The inner race 702 defines an opening 703 and includes a plurality of circumferentially-adjacent bearing elements 704 (e.g., a plurality of superhard compacts), each of which includes a convexly-curved bearing surface 706. The radial-bearing apparatus 700 further includes an outer race 708 (i.e., a rotor) that extends about and receives the inner race 702. The outer race 708 includes a plurality of circumferentially-spaced bearing elements 710 (e.g., a plurality of superhard compacts), each of which includes a concavely-curved bearing surface. The terms "rotor" and "stator" refer to rotating and stationary components of the radial-bearing apparatus 700, respectively. Thus, if the outer race 708 is configured to remain stationary, the outer race 708 can be referred to as the stator and the inner race 702 can be referred to as the rotor.

Each concavely-curved bearing surface of a corresponding bearing element 710 may include a load bearing section 714 and leading sections 716. Each leading section 716 may be slanted at an angle relative to the load bearing section 714 in a radial outward direction or may exhibit a leading section geometry similar to the leading sections shown in FIGS. 5E-5G. For example, each bearing element 710 may be configured as a superhard compact including a superhard table bonded to a substrate, with the load bearing section 714 and leading section 716 formed in the superhard table. The leading sections 716 help sweep lubricant onto the bearing surfaces 706 of the stator 702 to form a fluid film in a manner similar to the leading sections 520 of the bearing elements 514 shown in FIG. 5D. It is noted, that in other embodiments of the present invention, the bearing elements 710 may also be conventional in construction, without the slanted leading sections 716. A shaft or spindle (not shown) may extend through the opening 703 and may be secured to the stator 702 by press-fitting the shaft or spindle to the stator 702, threadly coupling the shaft or spindle to the stator 702, or another suitable technique. A housing (not shown) may also be secured to the rotor 704 using similar techniques.

The radial-bearing apparatus 700 may be employed in a variety of mechanical applications. For example, so-called "roller cone" rotary drill bits may benefit from a radial-bearing apparatus disclosed herein. More specifically, the inner race 702 may be mounted or affixed to a spindle of a roller cone and the outer race 708 may be affixed to an inner bore formed within a cone and that such an outer race 708 and inner race 702 may be assembled to form a radial-bearing apparatus.

It is noted that the inner race 702 of the radial-bearing assembly 700 is shown with a plurality of circumferentially-adjacent bearing elements assembled together to form a substantially continuous bearing element. However, in other embodiments of the present invention, an outer race of a radial-bearing apparatus may include a plurality of circumferentially-adjacent bearing elements assembled together that form a substantially continuous bearing element. In such an embodiment, an inner race of the radial-bearing apparatus may include a plurality of circumferentially-adjacent bearing elements, each of which may include a leading section, as previously described, configured to promote sweeping lubricant onto the substantially continuous bearing element of the outer race during operation.

In operation, rotation of the shaft sections (not shown) secured to the rotor 708 effects rotation of the rotor 708 relative to the stator 702. Drilling fluid or other lubricant may be pumped between the bearing surfaces 712 of the rotor 708 and the bearing surfaces 706 of the stator 702. When the rotor 704 rotates, the leading edge sections 716 of the bearing elements 710 may sweep lubricant (e.g., drilling fluid or other lubricant) onto the bearing surfaces 706 of the stator 702. As previously described with respect to the thrust-bearing apparatus 500, at sufficient rotational speeds for the rotor 708, a fluid film may develop between the bearing surface 712 of the bearing elements 710 and the bearing surfaces 706 of the bearing elements 704 having sufficient pressure to maintain the bearing surfaces 712 and the bearing surfaces 706 apart from each other. Accordingly, wear on the bearing elements 710 and bearing elements 702 may be reduced compared to when direct contact between the bearing elements 710 and bearing elements 702 occurs.

Figure 8:
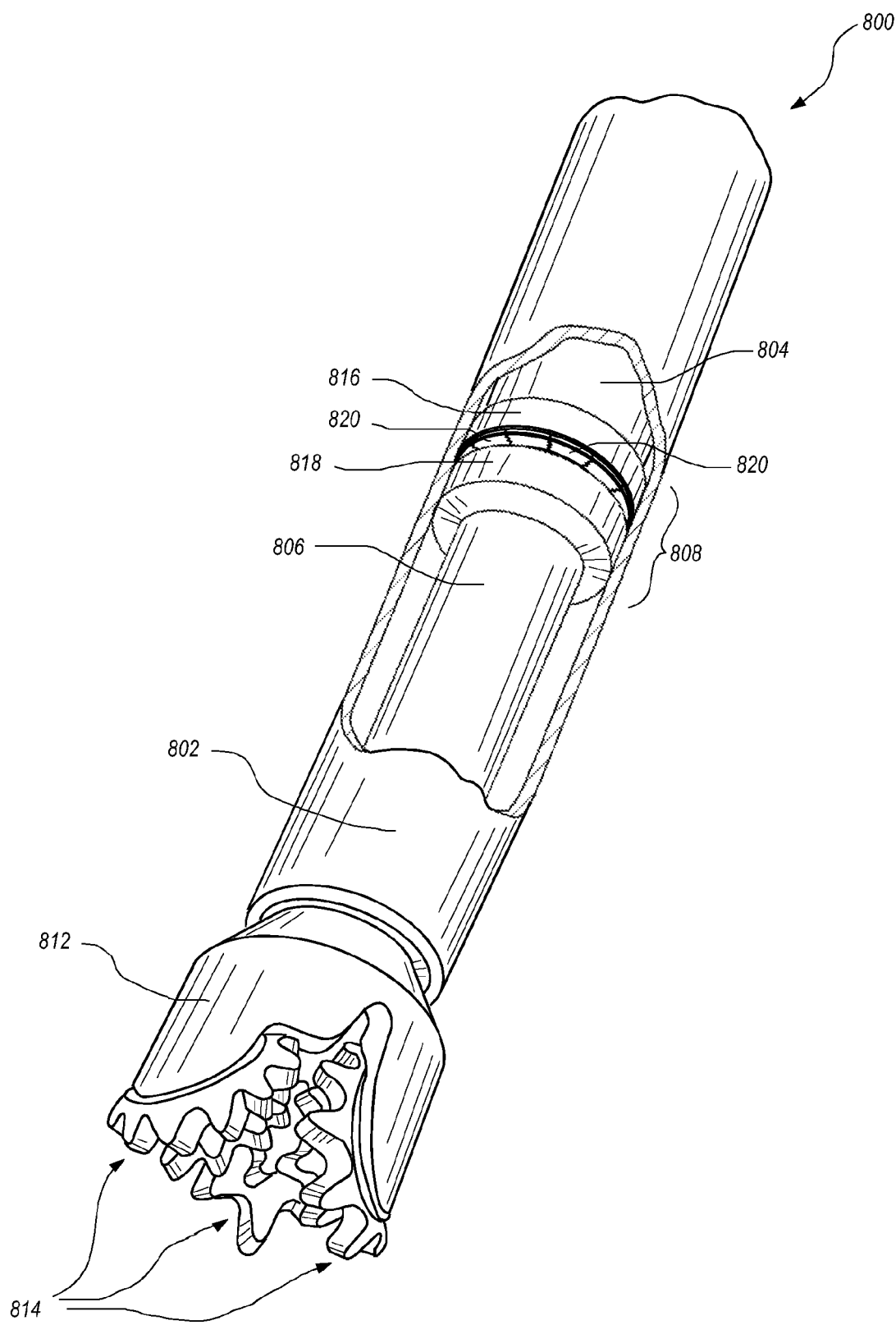
FIG. 8 is a schematic isometric partial cross-sectional view of a subterranean drilling system including a thrust-bearing apparatus utilizing any of the previously described bearing assemblies according to various embodiments of the present invention.

Any of the embodiments for bearing apparatuses discussed above may be used in a subterranean drilling system. FIG. 8 is a schematic isometric partial cross-sectional view of a subterranean drilling system 800 according to one embodiment of the present invention that uses a hydrodynamic thrust-bearing apparatus. The subterranean drilling system 800 includes a housing 802 enclosing a downhole drilling motor 804 (i.e., a motor, turbine, or any other device capable of rotating an output shaft) that is operably connected to an output shaft 806. A hydrodynamic thrust-bearing apparatus 808 is operably coupled to the downhole drilling motor 804. The hydrodynamic thrust-bearing apparatus 808 may be configured as any of the previously described hydrodynamic thrust-bearing apparatus embodiments. A rotary drill bit 812 configured to engage a subterranean formation and drill a borehole is connected to the output shaft 806. The rotary drill bit 812 is shown as a roller cone bit including a plurality of roller cones 814. However, other embodiments of the present invention may utilize different types of rotary drill bits, such as so-called "fixed cutter" drill bits. As the borehole is drilled, pipe sections may be connected to the subterranean drilling system 800 to form a drill string capable of progressively drilling the borehole to a greater depth within the earth.

The thrust-bearing apparatus 808 includes a stator 816 that does not rotate and a rotor 818 that is attached to the output shaft 106 and rotates with the output shaft 806. The stator 816 may include a plurality of circumferentially-adjacent bearing elements 820 assembled together to form a substantially continuous bearing element, as previously described such as in the hydrodynamic thrust-bearing assembly 200 shown in FIG. 2A. The rotor 818 may include a plurality of bearing elements (not shown) such as shown in the rotor 508 of FIG. 5D.

In operation, drilling fluid may be circulated through the downhole drilling motor 804 to generate torque and effect rotation of the output shaft 806 and the rotary drill bit 812 attached thereto so that a borehole may be drilled. A portion of the drilling fluid is also used to lubricate opposing bearing surfaces of the stator 816 and rotor 818. When the rotor 818 is rotated at a sufficient rotational speed, the drilling fluid is swept onto the bearing surfaces of the stator 816 and a fluid film having sufficient pressure may develop that maintains the bearing surfaces of the stator 816 and the bearing surfaces of the rotor 818 apart, as previously discussed.

Although the bearing assemblies and apparatuses described above have been discussed in the context of subterranean drilling systems and applications, in other embodiments of the present invention, the bearing assemblies and apparatuses disclosed herein are not limited to such use and may be used for many different applications, if desired, without limitation. Thus, such bearing assemblies and apparatuses are not limited for use with subterranean drilling systems and may be used with various other mechanical systems, without limitation.

Although the present invention has been disclosed and described by way of some embodiments, it is apparent to those skilled in the art that several modifications to the described embodiments, as well as other embodiments of the present invention are possible without departing from the spirit and scope of the present invention. Additionally, the words "including" and "having," as used herein, including the claims, shall have the same meaning as the word "comprising."

The invention claimed is:

1. A bearing apparatus, comprising:
   a first bearing assembly including a first support ring and a plurality of polycrystalline diamond bearing elements brazed to the first support ring, the plurality of polycrystalline diamond bearing elements circumferentially-spaced from each other; and
   a second bearing assembly including a second support ring and a substantially continuous polycrystalline diamond bearing element brazed to the second support ring, the substantially continuous polycrystalline diamond bearing element defining a substantially continuous polycrystalline diamond bearing surface, the substantially continuous polycrystalline diamond bearing surface generally opposing the plurality of polycrystalline diamond bearing elements of the first bearing assembly.

2. The bearing apparatus of claim 1 wherein the substantially continuous polycrystalline diamond bearing element includes a plurality of second polycrystalline diamond bearing elements defining the substantially continuous polycrystalline diamond bearing surface, the plurality of second polycrystalline diamond bearing elements defining respective gaps between circumferentially adjacent second polycrystalline diamond bearing elements of the plurality of second polycrystalline diamond bearing elements.

3. The bearing apparatus of claim 2 wherein at least some of the gaps are about 0.0051 mm to about 2.54 mm.

4. The bearing apparatus of claim 3 wherein the at least some of the gaps are about 0.0051 mm to about 0.051 mm.

5. The bearing apparatus of claim 2 wherein each of the plurality of second polycrystalline diamond bearing elements includes at least one side surface that exhibits a selected non-planar geometry.

6. The bearing apparatus of claim 5 wherein the selected non-planar geometry exhibits a serrated geometry.

7. The bearing apparatus of claim 5 wherein the selected non-planar geometry is curved.

8. The bearing apparatus of claim 2 wherein the gaps are at least partially filled with braze alloy.

9. The bearing apparatus of claim 2 wherein each of the plurality of second polycrystalline diamond bearing elements includes a substrate and a polycrystalline diamond table bonded to the substrate.

10. The bearing apparatus of claim 1 wherein the substantially continuous polycrystalline diamond bearing surface extends circumferentially about a thrust axis.

11. The bearing apparatus of claim 1 wherein the substantially continuous polycrystalline diamond bearing surface extends circumferentially about a rotation axis.

12. A bearing apparatus, comprising:
    a first bearing assembly including a first support ring and a plurality of circumferentially-spaced superhard bearing elements brazed to the first support ring, each of the plurality of circumferentially-spaced superhard bearing elements includes a first superhard bearing surface; and
    a second bearing assembly including:
       a second support ring; and
       a plurality of superhard bearing elements distributed circumferentially about an axis and brazed to the second support ring with a braze alloy, each of the second plurality of superhard bearing elements extending beyond the second support ring, each of the plurality of superhard bearing elements including a superhard bearing surface and at least one side surface, the superhard bearing surfaces of the second bearing assembly generally opposing the first superhard bearing surfaces of the first bearing assembly, each generally opposing pair of the at least one side surfaces defining a gap therebetween that is at least partially filled with the braze alloy which spans between the generally opposing pair of the at least one side surfaces, at least some of the gaps being about 0.0051 mm to about 2.54 mm.

13. The bearing apparatus of claim 12 wherein the at least some of the gaps are about 0.0051 mm to about 0.051 mm.

14. The bearing apparatus of claim 12 wherein the at least one side surface is substantially planar.

15. The bearing apparatus of claim 12 wherein the at least one side surface exhibits a selected non-planar geometry.

16. The bearing apparatus of claim 15 wherein the selected non-planar geometry exhibits a serrated geometry.

17. The bearing apparatus of claim 15 wherein the selected non-planar geometry is curved.

18. The bearing apparatus of claim 12 wherein each of the plurality of superhard bearing elements at least partially receives a circumferentially adjacent one of the plurality of superhard bearing elements.

19. A thrust-bearing apparatus, comprising:
    a first bearing assembly including a first support ring and a plurality of circumferentially-spaced polycrystalline diamond bearing elements brazed to the first support ring, each of the plurality of circumferentially-spaced polycrystalline diamond bearing elements includes a first polycrystalline diamond bearing surface; and
    a second bearing assembly including:
       a second support ring defining a slot; and
       a plurality of polycrystalline diamond bearing elements received by the slot of the second support ring and brazed to the second support ring with a braze alloy, the plurality of polycrystalline diamond bearing distributed circumferentially about a thrust axis, each of the plurality of polycrystalline diamond bearing elements extending beyond the second support ring, each of the plurality of polycrystalline diamond bearing elements including a polycrystalline diamond bearing surface and at least one side surface, the polycrystalline diamond bearing surfaces of the second bearing assembly generally opposing the first polycrystalline diamond bearing surfaces of the first bearing assembly, each of the plurality of polycrystalline diamond bearing elements at least partially receives a circumferentially adjacent one of the plurality of polycrystalline diamond bearing elements.

20. The thrust-bearing apparatus of claim 19 wherein each generally opposing pair of the at least one side surfaces defining a gap therebetween that is at least partially filled with the braze alloy, at least some of the gaps are about 0.0051 mm to about 2.54 mm.

* * * * *